(12) United States Patent
Lendler

(10) Patent No.: US 8,515,789 B1
(45) Date of Patent: Aug. 20, 2013

(54) METHOD FOR OPTIMIZING REVENUE OR PROFIT OF A GAMBLING ENTERPRISE

(76) Inventor: Jennifer Kutcher Lendler, Philadelphia, PA (US)

( * ) Notice: Subject to any disclaimer, the term of this patent is extended or adjusted under 35 U.S.C. 154(b) by 2729 days.

(21) Appl. No.: 10/767,377

(22) Filed: Jan. 29, 2004

(51) Int. Cl.
*G06Q 10/00* (2012.01)

(52) U.S. Cl.
USPC .................................................. 705/7.11

(58) Field of Classification Search
USPC ........................................................ 705/7.11
See application file for complete search history.

(56) References Cited

U.S. PATENT DOCUMENTS

| | | | |
|---|---|---|---|
| 5,129,652 A | 7/1992 | Wilkinson | |
| 5,241,465 A * | 8/1993 | Oba et al. | 705/8 |
| 5,496,032 A | 3/1996 | Okada | |
| 5,611,730 A | 3/1997 | Weiss | |
| 5,630,070 A * | 5/1997 | Dietrich et al. | 705/8 |
| 5,770,533 A | 6/1998 | Franchi | |
| 5,963,919 A * | 10/1999 | Brinkley et al. | 705/28 |
| 6,003,013 A | 12/1999 | Boushy et al. | |
| 6,035,277 A | 3/2000 | Anbil et al. | |
| 6,254,483 B1 | 7/2001 | Acres | |
| 6,267,671 B1 | 7/2001 | Hogan | |
| 6,341,269 B1 * | 1/2002 | Dulaney et al. | 705/22 |
| 6,354,943 B1 | 3/2002 | Miura | |
| 6,383,076 B1 | 5/2002 | Tiedeken | |
| 6,446,864 B1 | 9/2002 | Kim et al. | |
| 6,500,066 B1 | 12/2002 | Bower et al. | |
| 6,615,092 B2 | 9/2003 | Bickley et al. | |
| 6,708,155 B1 * | 3/2004 | Honarvar et al. | 705/7 |
| 7,536,283 B2 * | 5/2009 | Potter et al. | 703/1 |
| 2001/0047293 A1 * | 11/2001 | Waller et al. | 705/10 |
| 2002/0143595 A1 * | 10/2002 | Frank et al. | 705/8 |
| 2003/0014291 A1 | 1/2003 | Kane et al. | |
| 2003/0171149 A1 * | 9/2003 | Rothschild | 463/42 |
| 2003/0200129 A1 * | 10/2003 | Klaubauf et al. | 705/8 |
| 2004/0085293 A1 * | 5/2004 | Soper et al. | 345/156 |
| 2005/0021348 A1 * | 1/2005 | Chan et al. | 705/1 |

FOREIGN PATENT DOCUMENTS

WO    WO 0079438 A1 * 12/2000

OTHER PUBLICATIONS

Bayus, Barry L.; Banker, Robert L.; Gupta, Shiv K.; Stone, Bradley H.; "Evaluating Slot Machine Placement on the Casino Floor". Mar.-Apr. 1985. The Institute of Management Sciences. Interfaces 15. pp. 22-23.*

Lucas, Anthony F.; Roehl, Wesley S.; "Influences on Video Poker Machine Performance: Measuring the Effect of Floor Location". 2002. Journal of Travel & Tourism Marketing. vol. 12, Issue 4. pp. 75-92.*

(Continued)

*Primary Examiner* — Romain Jeanty
(74) *Attorney, Agent, or Firm* — Eckert Seamans Cherin & Mellott, LLC; Kirk D. Houser

(57) ABSTRACT

A method optimizes revenue or profit for a gambling enterprise, such as a casino. The method employs a plurality of different gaming units, such as table games and electronic gaming devices, in the gambling enterprise. A plurality of counts is employed, one of the counts for each of the different gaming units. A plurality of decision functions is employed, with at least one of the decision functions for each of the different gaming units. Revenue or profit optimization is employed as an objective function. Optimal values for the counts for each of the different gaming units are determined from the decision functions and a plurality of constraints in order to optimize the objective function.

22 Claims, 7 Drawing Sheets

(56) References Cited

OTHER PUBLICATIONS

Domschke, Wolfgang; Krispin, Gabriela. "Location and Layout Planning". 1997. OR Spektrum. vol. 19. pp. 181-194.*

Corstjens, Marcel; Doyle, Peter. "A Model for Optimizing Retail Space Allocations". Jul. 1982. Management Science. vol. 27, Issue 7. pp. 822-833.*

Lucas, Anthony F.; Dunn, William T.; Roehl, Wesley S.; Wolcott, Guy M.; "Evaluating Slot Machine Performance: A Performance-Potential Model". 2003. Hospitality Management. Voume 23. pp. 103-121.*

Borin, Norm; Farris, Paul W.; Freeland, James R.; "A Model for Determining Retail Product Category Assortment and Shelf Space Allocation". 1994. Decision Sciences. vol. 25, Issue 3. pp. 359-384.*

Kilby, Jim; Fox, Jim; "Casino Operations Management". 1998.. John Wiley & Sons.*

"Goodyear Implements Trilogy's MultiChannel Pricing Solution as Its Enterprise-Wide E-Pricer Platform". Jun. 27, 2000. PR Newswire.*

* cited by examiner

METHOD FOR OPTIMIZING REVENUE OR PROFIT OF A GAMBLING ENTERPRISE

BACKGROUND OF THE INVENTION

1. Field of the Invention

This invention pertains generally to methods for optimizing revenue or profit of a gambling enterprise and, more particularly, to such methods for optimizing revenue or profit generated by gaming units on a casino floor.

2. Background Information

Gambling enterprises, such as casinos, generate gaming revenue in many ways and from many sources. These can include, but are not limited to, the operation of table games, electronic gaming devices (EGDs) such as slot machines, video lottery terminals (VLTs), video poker machines, keno, bingo, pulltabs, race and sports wagers, as well as other forms of gaming that occur on the casino floor. However, table games and EGDs produce the largest percentage of gaming revenue and profit for most casinos and are areas of particular interest and scrutiny by casino managers.

Additionally, the size of a casino floor is generally constrained either by direct regulation, which restricts total space, or practical or monetary considerations on the part of the operator. The amount of space available to a casino operator within which to generate revenue and profit is therefore finite. Casino operators thus wish to strive to optimize revenue and profit in gaming operations given this limited available floor space.

Gambling enterprises use various types of casino management systems (CMSs) to provide information on activity generated from gaming activities. A CMS gathers data on money wagered at gaming units throughout the casino, with information available generally on a daily basis, although some CMSs provide information of even greater detail (e.g., by hour; by shift).

Additionally, casinos utilize various financial reporting systems (FRSs). Information from the CMS is often used by the FRS in developing financial statements and creating financial reports on gaming departments. These statements and reports provide casino managers with information on the overall revenue performance ("win") from gaming and other sources at the casino property, as well as costs associated with operating these departments, since the FRS is also often the primary repository of information on expenses throughout the property. Information is often provided grouped by broad category (e.g., casino; hotel; food) as well as by sub-category or department (e.g., table games; EGDs; casino cage (e.g., an area on the casino floor where financial transactions are completed to serve the needs of the patrons on the gaming floor as well as to provide cash, coin, and chip resources to the gaming units in operation on the gaming floor; patrons may, for example, cash checks, change currency for coin or redeem chips won at a table game at the casino cage); rooms; food outlet A; food outlet B).

Aside from preparing financial statements, data from activities on the gaming floor are also collected to assist the marketing department in performing various analyses. It is standard practice in the industry to establish systems for collecting and tracking customer activity at casinos for use in customer recognition and marketing programs, the goal of which is to attempt to generate as much customer visitation as possible. The presumption is that more customer visits will tend to generate more gaming time and will increase gaming revenue. Thus, casino operators have tended to focus their effects on determining ways to increase visitation through loyalty programs or promotions to selected higher worth customers, as determined by a customer database analysis. See, for example, U.S. Pat. No. 6,003,013.

It is known to control the cost of playing an individual electronic gaming device (e.g., slot machine; video poker machine) by configuring game speed, payback percentage, and game appearance. See U.S. Pat. No. 6,254,483.

It is also known to allocate different games to various game machines based upon time periods, dates, type of players or the traffic line of players, without the replacement of the game machines. See U.S. Pat. No. 6,354,943.

It is further known to manage gaming tables in a gaming facility by determining the performance of dealers and by estimating the revenue for each gaming table. See U.S. Pat. No. 6,446,864.

It is also known to employ a casino drawing/lottery game to attempt to maximize gaming revenues by influencing which kind of games players play. See U.S. Pat. No. 5,129,652.

It is further known to increase revenues by offering a relatively more attractive loss ratio, while incurring essentially the same fixed costs for a gambling operation. See U.S. Pat. No. 6,500,066.

There is room for improvement in methods for optimizing revenue or profit of a gambling enterprise.

SUMMARY OF THE INVENTION

These needs and others are met by the present invention, which provides a method for optimizing profit or revenue of a gambling enterprise.

It is believed that known prior attempts to increase revenue or to increase profit from gambling enterprises, such as casinos, have not been optimal and have not employed techniques to optimize revenue or profit by analyzing data on past gaming activity to determine demand functions of gaming units employed, and for the optimization of profit by also analyzing the cost structure in place to service the gaming units employed, in order to determine through such analysis the optimal solution set of gaming units to employ to reach optimal revenue or profit.

It is believed that no prior attempt has been made to optimize revenue from gaming units on a casino floor by determining the key characteristics of the gaming units, defining these key characteristics as decision variables, analyzing demand functions for each of these decision variables, determining reasonable constraints, and applying linear or non-linear programming techniques to optimize the revenue.

Furthermore, it is believed that no prior attempt has been made to optimize profit from gaming units on a casino floor by determining their key characteristics, defining these key characteristics as decision variables, analyzing demand functions for each of these decision variables, analyzing fixed and variable cost functions for each of the related casino departments, determining reasonable constraints, and applying linear or non-linear programming techniques to optimize the profit.

The present invention optimizes revenue or profit of a gambling enterprise, such as a casino or casino floor, by, for example, determining the mix of gaming units, such as table games and electronic gaming devices, such as slot machines, on the casino floor. The present invention thus provides a method for optimizing revenue or profit generated from gaming units on the casino floor.

In accordance with one aspect of the invention, a method for optimizing revenue or profit for a gambling enterprise comprises: employing a plurality of different gaming units in the gambling enterprise; employing a plurality of counts, one of the counts for each of the different gaming units; employing a plurality of decision functions, at least one of the decision functions for each of the different gaming units; employing revenue or profit optimization as an objective function; and determining optimal values for the counts for each of the different gaming units from the decision functions in order to optimize the objective function.

The method may include employing a casino floor having a physical area as the gambling enterprise; employing a physical area associated with each of the different gaming units; employing a plurality of different electronic gaming devices and a plurality of different table games as some of the different gaming units; and employing a constraint to require the physical area of the different electronic gaming devices and the physical area of the different table games to be less than or equal to the physical area of the casino floor when the optimal values are determined for the counts for each of the different gaming units.

The method may include employing a predetermined time period for at least some of the decision functions; and including current and historical time series revenue data and current and historical time series cost data in the predetermined time period for the at least some of the decision functions.

The method may include employing revenue optimization as the objective function; employing at least one constraint for at least some of the different gaming units as one of the decision functions; determining time series revenue data for the different gaming units and determining a plurality of demand functions, one of the demand functions for each of the different gaming units; employing the demand functions as some of the decision functions; and determining the optimal values from the at least one constraint and the demand functions.

The method may include employing profit optimization as the objective function; employing at least one constraint for at least some of the different gaming units as one of the decision functions; determining time series revenue data for the different gaming units and determining a demand function for each of the different gaming units; determining time series cost data for the different gaming units and determining a cost function for the different gaming units; employing the demand function for each of the different gaming units and the cost function for the different gaming units as some of the decision functions; and determining the optimal values from the at least one constraint, the demand function for each of the different gaming units and the cost function for the different gaming units.

As another aspect of the invention, a method for optimizing revenue for a gambling enterprise comprises: identifying a plurality of different classes of gaming units in the gambling enterprise; employing a plurality of counts, one of the counts for each of the different classes; employing at least one decision function for the different classes; employing revenue optimization as an objective function; determining time series revenue data for the different classes and determining a plurality of demand functions, one of the demand functions for each of the different classes; and determining optimal values for the counts for each of the different classes from the at least one decision function and the demand functions, in order to optimize the objective function and optimize revenue from the different classes of gaming units.

The method may include employing a plurality of constraints associated with the different classes of gaming units; translating the constraints to a plurality of mathematical expressions; employing the mathematical expressions as the at least one decision function; and employing the demand functions and the mathematical expressions to determine the optimal values for the counts.

The method may include determining whether the optimal values for the counts are reasonable values; responsively adjusting the constraints; translating the adjusted constraints to a plurality of corresponding mathematical expressions; and re-determining optimal values for the counts for each of the different classes from the demand functions and the corresponding mathematical expressions, in order to optimize the objective function and optimize revenue from the different classes of gaming units.

The method may include employing at least one constraint associated with the different classes of gaming units; translating the at least one constraint to at least one mathematical expression; employing the at least one mathematical expression as the at least one decision function; translating the demand functions to a plurality of polynomial equations; and determining the optimal values from the at least one mathematical expression and the polynomial equations, in order to optimize the objective function.

As another aspect of the invention, a method for optimizing profit for a gambling enterprise comprises: identifying a plurality of different classes of gaming units in the gambling enterprise; employing a count for each of the different classes; employing at least one decision function for the different classes; employing profit optimization as an objective function; determining time series revenue data for the different classes and determining a demand function for each of the different classes; determining time series cost data for the different classes and determining a cost function for the different classes; and determining optimal values for the counts for each of the different classes from the at least one decision function, the demand function for each of the different classes and the cost function for the different classes, in order to optimize the objective function.

The method may include employing a plurality of constraints associated with the different classes of gaming units; translating the constraints to mathematical expressions; employing the mathematical expressions as the at least one decision function; and employing the demand functions, the cost functions and the mathematical expressions to determine the optimal values for the counts.

The method may include identifying a plurality of gaming departments associated with the plurality of different classes of gaming units; determining historical fixed costs and historical variable costs for each of the gaming departments; and determining an historical fixed cost function and an historical variable cost function for each of the gaming departments from the historical fixed costs and the historical variable costs, respectively.

The method may include determining an historical fixed cost function and an historical variable cost function for each of the different classes of gaming units.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "gambling enterprise" shall expressly include, but not be limited by, a casino, a casino floor, a slot parlor, a video lottery terminal (VLT) parlor, a "racino", or any enterprise where patrons engage in gambling activity.

As employed herein, the term "table games" shall expressly include, but not be limited by, table gambling games such as, for example, Blackjack ("21"), Craps ("Dice"), Roulette, Caribbean Stud Poker, Pai Gow, Pai Gow Poker, Let it Ride, 3 Card Poker, Baccarat, Mini-Baccarat, and Sic Bo.

As employed herein, the term "electronic gaming device" or "EGD" shall expressly include, but not be limited by, any coin-activated, currency-activated, debit-activated or credit-activated game on which a player may place a wager. Some non-limiting examples of EGDs include video poker; video blackjack; video keno; slot machines; video roulette; craps machines; EGDs by denomination (e.g., Penny; Nickel; Dime; Quarter; Half Dollar; Dollar; Five Dollar; Ten Dollar; Twenty-five dollar; Hundred Dollar; Multi-denominational); EGDs by type (e.g., Reel; Video reel; Video poker; Proprietary or Participation; Progressive); EGDs by "personality" or theme associated with the game (e.g., Double Diamonds; Blazing 7s; Wheel of Fortune); and EGDs made by different manufacturers (e.g., Bally Gaming Systems; International Game Technology; WMS Industries; Aristocrat; AC Coin & Slot; Alliance Gaming; Atronic; Mikohn Gaming; Shuffle Master Gaming).

As employed herein, the term "games" or "gaming" shall expressly include, but not be limited by, table games, EGDs, Race and sports book, Poker, Keno, Bingo, and Pulltabs.

As employed herein, the term "denomination" is a specific monetary amount of a coin or token. Some common denominations include, for example, pennies, nickels, quarters and dollars, although larger denominations are available as well.

As employed herein, the term "progressive" as applied to an EGD, such as a slot machine, provides a progressive slot machine, which takes a percentage of all coins that are played and adds it to a jackpot that increases in value. Players hitting the winning jackpot symbols win the total accumulated jackpot.

As employed herein, the term "proprietary" or "participation" games include slot machines or other games where the equipment supplier retains ownership of the machine and leases it to the casino, thus "participating" in the machine's revenue stream.

The present invention is described in association with optimizing revenue or profit generated by gaming units on the casino floor. It will be appreciated, however, that the present invention is applicable to a wide range of gambling enterprises.

Figure 1:
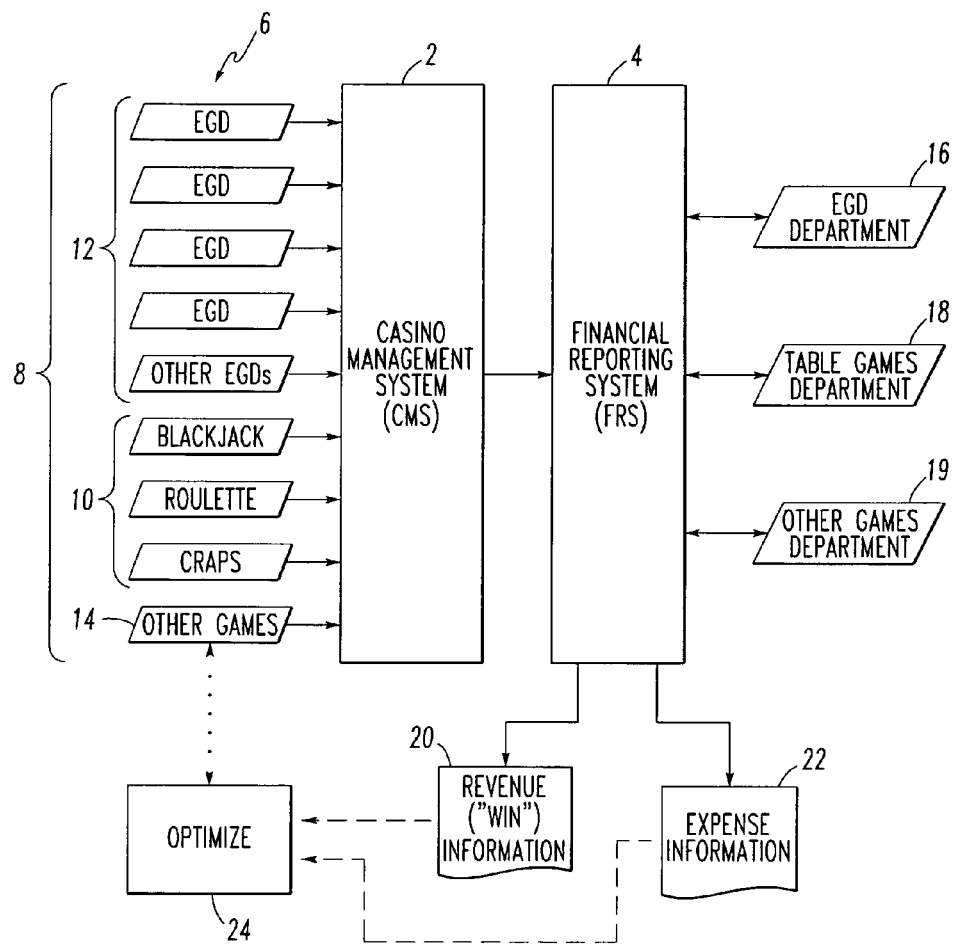
FIG. 1 is a block diagram of data gathering systems for a casino operation and an optimization procedure in accordance with the present invention.

FIG. 1 shows data gathering systems 2,4 for a casino operation including a casino floor 6. The casino floor 6 includes a plurality of gaming units 8, which, in turn, include a plurality of table games 10, a plurality of electronic gaming devices (EGDs) 12 and other gambling games 14. As will be disclosed, data is generated from queries to the casino management system (CMS) 2 to provide information on activity generated from gaming activities, and from the financial reporting system (FRS) 4. Typically, the FRS 4 is employed by the EGD department 16 of the casino, which is responsible for the various EGDs 12, by the table games department 18, which is responsible for the various tables games 10, and by the "Other Games" department 19, which is responsible for the various other gambling games 14. The FRS 4 provides both revenue ("win") information 20 associated with casino revenue from the gaming units 8, and expense information 22 associated with expense for the gaming units 8. In accordance with the present invention, an optimization procedure 24 is disclosed to optimize the counts of the different gaming units 8 from decision functions in order to optimize an objective function, such as revenue or profit, for the casino. Although a particular casino is disclosed, it will be appreciated that the invention is applicable to a wide range of gambling enterprises, such as, for example, another gambling enterprise or a casino having one or more departments.

Figure 2:
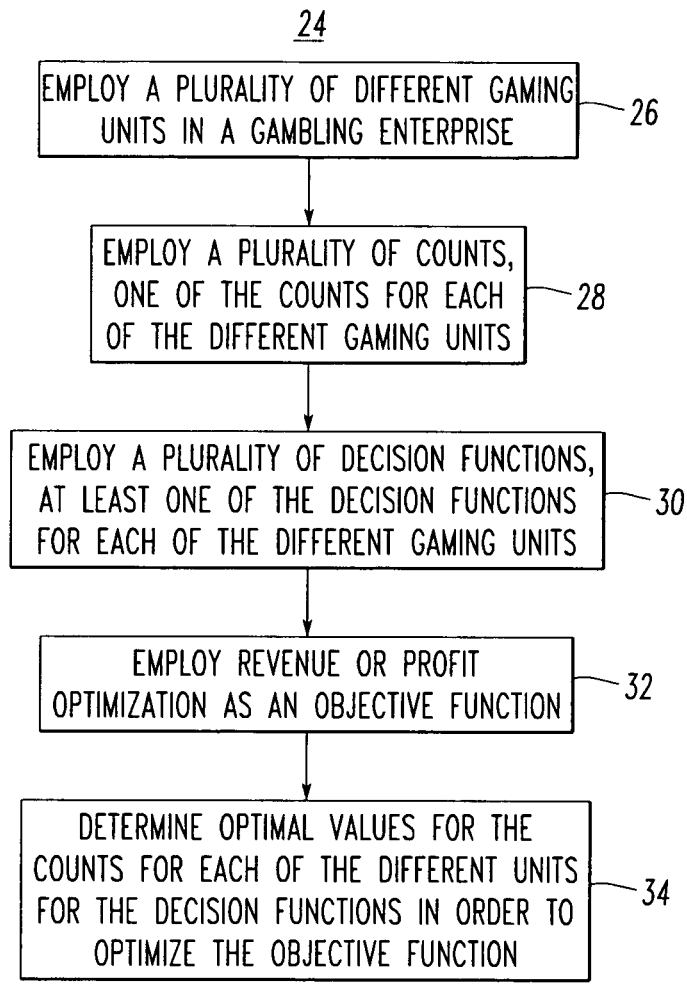
FIG. 2 is a flowchart of revenue or profit optimization steps in accordance with the present invention.

As shown in FIG. 2, the steps of the optimization procedure 24 are employed to optimize revenue or profit for a gambling enterprise. First, at 26, a plurality of different gaming units, such as 8 of FIG. 1, are employed in the gambling enterprise. Then, at 28, a plurality of counts are employed, with one of the counts for each of the different gaming units. Next, at 30, a plurality of decision functions are employed, with at least one of the decision functions for each of the different gaming units. At 32, revenue or profit optimization is employed as an objective function. Finally, at 34, optimal values for the counts for each of the different gaming units are determined from the decision functions in order to optimize the objective function.

Figure 3:
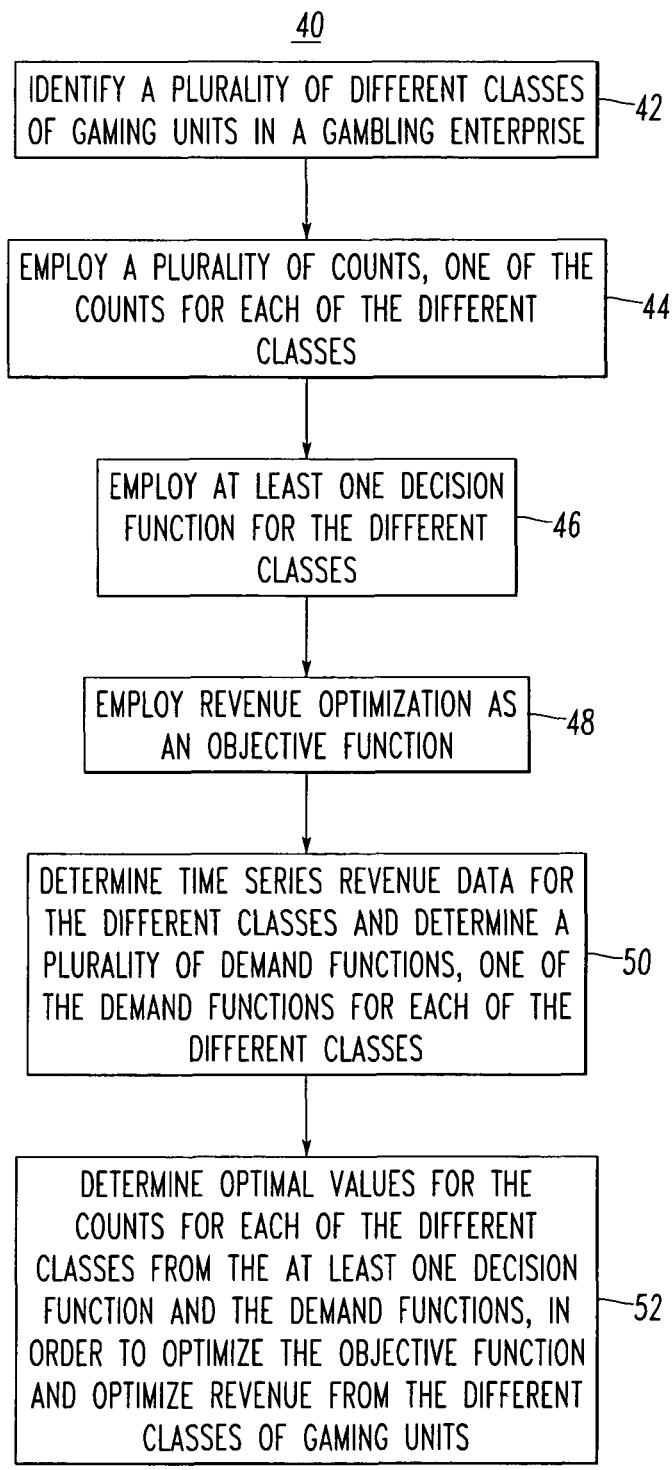
FIG. 3 is a flowchart of revenue optimization steps in accordance with another embodiment of the invention.

FIG. 3 shows another optimization procedure 40, which is employed to optimize revenue for a gambling enterprise. First, at 42, a plurality of different classes of gaming units, such as 8 of FIG. 1, are employed in the gambling enterprise. Next, at 44, a plurality of counts is employed, with one of the counts for each of the different classes. Then, at 46, at least one decision function, such as one or more constraints, is employed for the different classes. At 48, revenue optimization is employed as an objective function. Next, at 50, time series revenue data is determined for the different classes and a plurality of demand functions is determined, with one of the demand functions for each of the different classes. Finally, at 52, optimal values are determined for the counts for each of the different classes from the at least one decision function and the demand functions, in order to optimize the objective function and optimize revenue from the different classes of gaming units.

Figure 4:
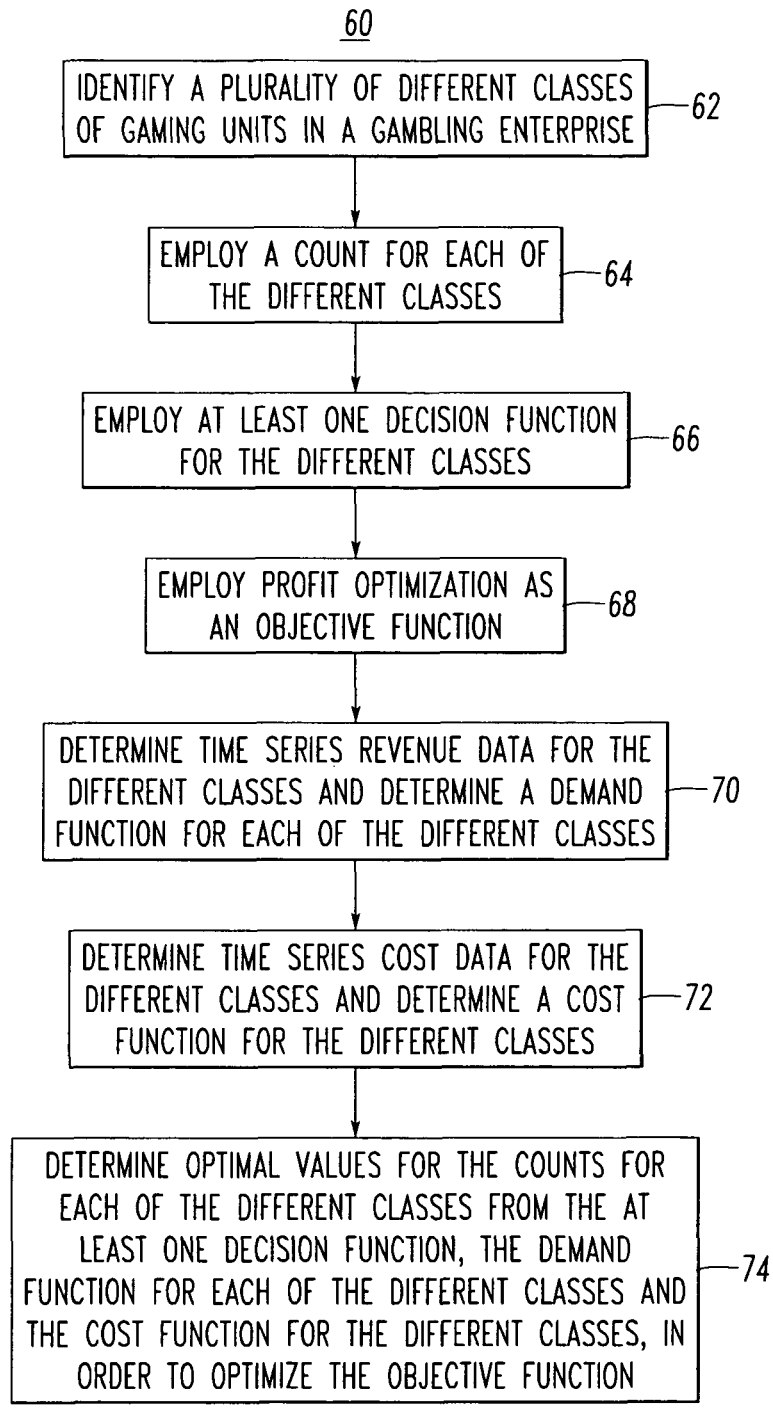
FIG. 4 is a flowchart of profit optimization steps in accordance with another embodiment of the invention.

FIG. 4 shows another optimization procedure 60, which is employed to optimize profit for a gambling enterprise. First, at 62, a plurality of different classes of gaming units, such as 8 of FIG. 1, are identified in the gambling enterprise. Next, at 64, a count is employed for each of the different classes. Then, at 66, at least one decision function, such as one or more constraints, is employed for the different classes. At 68, profit optimization is employed as an objective function. Next, at 70, time series revenue data is determined for the different classes and a demand function is determined for each of the different classes. Then, at 72, time series cost data is determined for the different classes and a cost function is determined for the different classes. Finally, at 74, optimal values for the counts for each of the different classes are determined from the at least one decision function, the demand function for each of the different classes and the cost function for the different classes, in order to optimize the objective function.

Figure 5A:
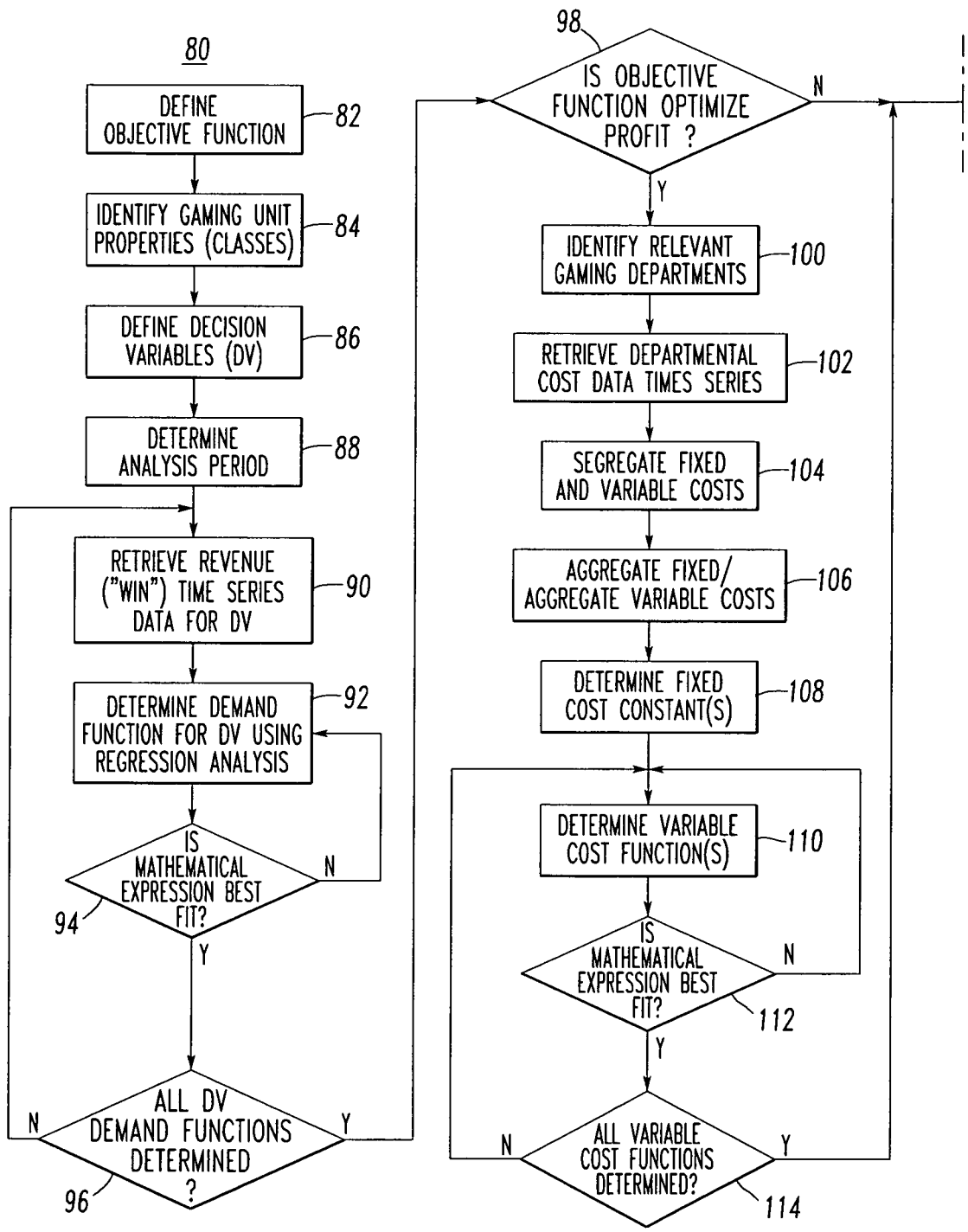
FIGS. 5A-5B are a flowchart of revenue and profit optimization steps in accordance with another embodiment of the invention.
Figure 5B:
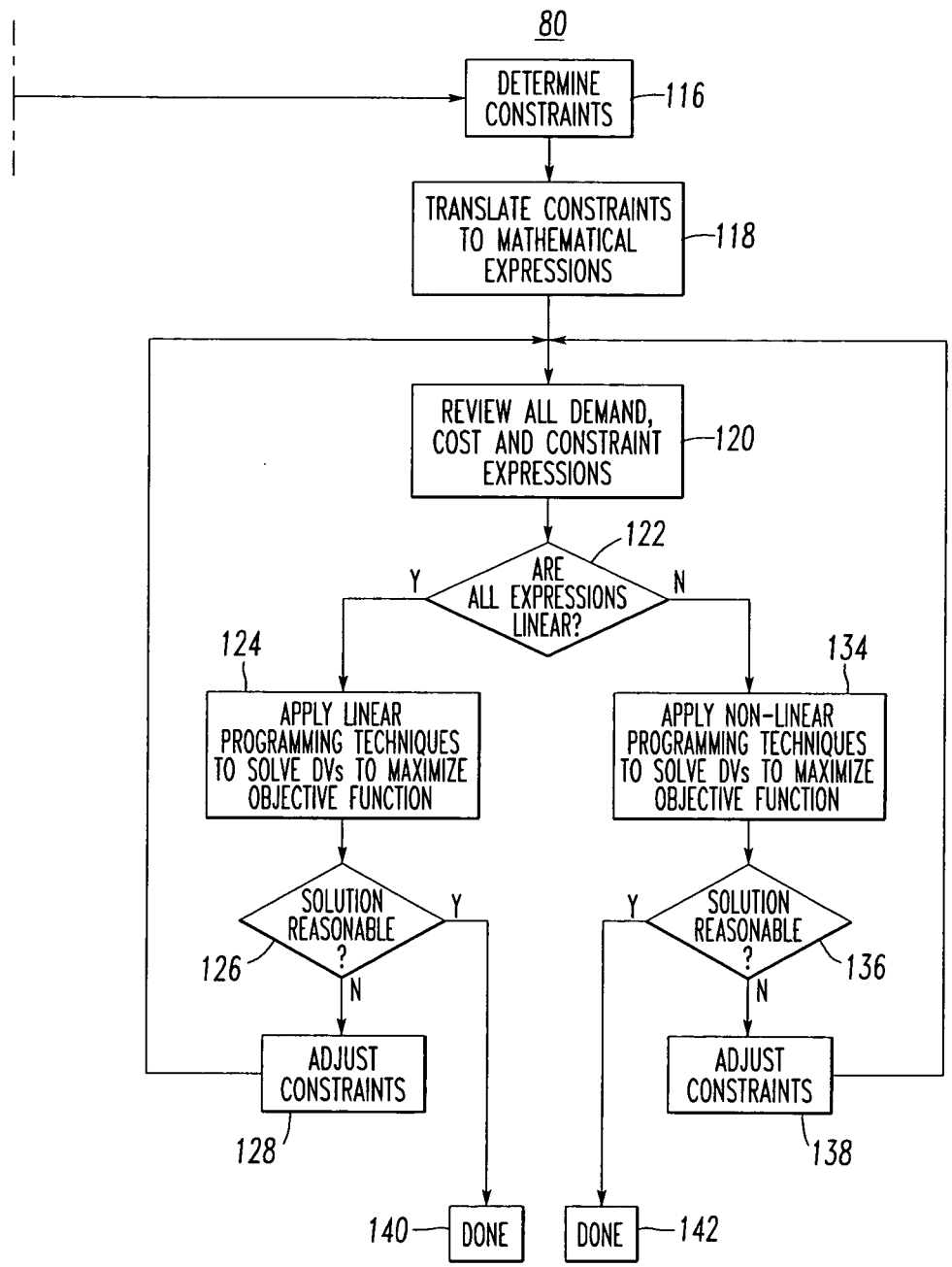

FIGS. 5A-5B show another optimization procedure 80, which is employed to optimize revenue or profit for a gambling enterprise. First, at 82, the objective function is defined. This determines the value that is to be optimized, such as revenue generated by gaming units on the casino floor, or profit generated from gaming units on the casino floor to which casino departmental costs, both fixed and variable, are applied to determine profitability. Next, at 84, the gaming unit properties (classes) are identified.

EXAMPLE 1

For example, as was discussed above in connection with FIG. 1, the different classes of the gaming units 8 on the casino floor 6 include a plurality of different classes of the table games 10 and a plurality of different classes of the EGDs 12.

EXAMPLE 2

As another example, gaming units utilized in a casino operation to generate revenue are grouped into classes based on relevant characteristics that distinguish them from other units. These classes could be, for example, game type for table games (e.g., blackjack; craps; roulette) and denomination of wager for EGDs (e.g., nickel; quarter; dollar).

EXAMPLE 3

Within a table games operation, there are many types of games (e.g., blackjack; craps; roulette; big six; pai gow; pai gow poker). Within an EGD operation, there are many different types of EGDs on the casino floor. These EGDs can be classified, for example, in terms of denomination of wager (e.g., nickel; quarter; dollar), type (e.g., slot; video poker; progressive; participation), and "personality" (e.g., Double Diamonds; Blazing 7s; Wheel of Fortune). A gambling enterprise determines which classification or characteristic of the gaming units on the casino floor will be analyzed, in order to define the decision variables.

Next, at 86, a plurality of decision variables (DVs) associated with casino revenue are defined.

EXAMPLE 4

Casinos generate gaming revenue in many ways (e.g., the operation of table games; electronic gaming devices (EGDs); keno; bingo; pulltabs; race and sportsbooks). Primary drivers of revenue and profit are, most typically, table games and EGD operations. Hence, DVs are typically assigned to the different classes of tables games and to the different classes of EGDs, although a wide range of other classes may be employed.

At 88, the analysis time period is determined.

EXAMPLE 5

Preferably, about 36 months of data, if available, is gathered for the time series revenue data, the demand functions and the time series cost data. Although an example analysis period is disclosed, it will be appreciated that a wide range of relatively shorter and relatively longer analysis periods may be employed.

Even steps 90-96 determine a separate historical/current demand function for each of the different classes of gaming units (e.g., nickel EGD; quarter EGD; dollar EGD; blackjack; craps; roulette). Depending on the nature of the data series, the resultant best-fit equation (e.g., least squares; maximum $r^2$ value) may be, for example, linear (e.g., $y=mx+b$, wherein m is the slope and b is the y-intercept), polynomial (e.g., $y=b+c_1 x+c_2 x^2+c_3 x^3+ \ldots +c_n x^n$, wherein b and $c_1, c_2, c_3 \ldots c_n$ are constants), logarithmic (e.g., $y=c \ln x+b$, wherein c and b are constants and ln is the natural logarithm function), exponential (e.g., $y=ce^{bx}$, wherein c and b are constants and e is the base of the natural logarithm), or power (e.g., $y=cx^b$, wherein c and b are constants). For example, a linear trend line is generally a best-fit when data values increase or decrease at a steady rate; a polynomial trend line is generally a best-fit curve when data values fluctuate and there are gains or losses over a large data set; a logarithmic trend line is generally a best-fit curve when the rate of change in the data values increases or decreases quickly and then levels out; an exponential trend line is generally a best-fit curve for data values that rise or fall at increasingly higher rates; and a power trend line is generally a best-fit curve when data values increase at a specific rate.

First, at 90, times series data for the decision variables are retrieved. Typically, this includes employing a predetermined analysis period, as was selected at 88, and a predetermined count of samples of time series revenue data, including a revenue value and a count of the different classes of gaming units for each of the samples. For example, using the CMS 2, the FRS 4 of FIG. 1 and/or other relevant data sources, the time series data is retrieved that reveals both total revenue generated ("win") from a specific class of the gaming units 8, and the total number of units of that class on the casino floor 6 during those same periods of time. As determined at 96, the time series data of this type is retrieved, at 90, for all of the different decision variables as were determined at 86.

Due to the timeliness of data generally available from the FRS 4 of FIG. 1 and other systems routinely used in casino operations, a demand function (or cost function, as is discussed below in connection with steps 108 and 110) may incorporate both historical (e.g., one year ago; three years ago) and current (e.g., today; yesterday) demand characteristics in one equation or mathematical expression. If desired, separate long-term (e.g., greater than one year) and short-term (e.g., less than one year) demand curves may be determined and employed. However, it is believed that relevancy issues suggest that demand curves preferably aggregating the prior about three years of data (as selected at step 88) will reveal the trends that are needed to properly solve for the optimal state of the decision variables.

Next, at step 92, using suitable regression analysis techniques, a demand function for each of the decision variables is defined. With the regression analysis, each set of time series revenue data is analyzed to determine its proper mathematical expression. These expressions effectively represent the demand function for each of the classes of gaming units utilized in the casino. For example, a statistical regression analysis technique models the relationship between variables. Scatter plots may represent sample data points for different combinations of two variables (e.g., X and Y). A regression line may be fit to the scatter plot to reveal a linear or a non-linear relationship between the two variables. Also, a coefficient of determination, $r^2$, may be employed as a measure of the strength of the regression relationship, in order to measure how well the regression line fits the data. For example, an $r^2$ value of about 0.9 may fit the data relatively well, while an $r^2$ value of about 0.75 would explain relatively less of the data and, therefore, would not be as relatively good of a fit for the data.

For example, the first pass through step 92 for a first decision variable may employ regression analysis to convert the time series revenue data for a corresponding one of the classes of gaming units to a first type of mathematical expression (e.g., a linear equation with an $r^2$ value of about 0.9) for this demand function. Then, the first pass through step 94 would determine that there was no best fit, since only one type of mathematical expression had been considered, and step 92 would be repeated.

Then, the second pass through step 92 for the first decision variable may employ regression analysis to convert the time series revenue data for the corresponding one of the classes of gaming units to a second type of mathematical expression (e.g., a polynomial equation with an $r^2$ value of about 0.75) for this demand function. Then, the second pass through step 94 would determine that the linear equation, in this example, was the better fit of those two types of mathematical expressions.

Next, steps 92 and 94 may be repeated, as desired, for other types of mathematical expressions (e.g., logarithmic; exponential; power). Hence, depending on the nature of the time series revenue data, the resultant best-fit (e.g., maximum $r^2$ value) equation may be, for example, linear, polynomial, logarithmic, exponential or power. Then, the final pass through step 94 for the first decision variable would select the mathematical expression which provides a best fit (e.g., the maximum $r^2$ value) for the time series revenue data.

Then, at 96, it is determined if all of the demand functions have been determined for the various decision variables. In this example, since there are a plurality (e.g., six) of decision variables, even steps 90-96 are repeated five times to determine the mathematical expressions that provide the best fit for the demand functions for all decision variables. After 96, the next step is 98.

Step 98 determines whether the objective function from step 82 is profit optimization. If so, then the procedure resumes at 100. On the other hand, if the selected objective function from step 82 is revenue optimization, then the procedure resumes at 116.

If profit is determined to be the objective function to be optimized, at 82 and 98, then even steps 100-114 determine historical/current cost functions for each of the decision variables. At 100, the relevant gaming departments (e.g., table games; EGD) associated with the different classes of gaming units are determined. Next, at 102, additional time series data for the selected analysis period of step 88 is acquired from the FRS 4 of FIG. 1. For example, time series data on costs within the relevant gaming departments are retrieved by line item in order to be able to classify each line item as a fixed cost or a variable cost. In addition, the total number of gaming units served by this gaming department during these same time periods is also retrieved.

Next, at 104, fixed costs and variable costs are segregated. Then, at 106, the variable costs and the fixed costs within the various gaming departments are separately aggregated for each of those departments.

At 108, an historical fixed cost function (i.e., a constant) is determined for each department. As an example, there would be a fixed cost constant for the table games department and a fixed cost constant for the electronic gaming devices department.

Similar to step 92, a variable cost function for each of the gaming departments is defined using suitable regression analysis techniques at 110. For example, there would be a first variable cost function for the table games department as a function of the count of table game units, and a second variable cost function for the electronic gaming devices department as a function of the count of electronic gaming devices. For example, a statistical regression analysis technique models the relationship between variables. Scatter plots may represent sample data points for different combinations of two variables (e.g., X and Y). A regression line may be fit to the scatter plot to reveal a linear or a non-linear relationship between the two variables. Also, a coefficient of determination, $r^2$, may be employed as a measure of the strength of the regression relationship, in order to measure how well the regression line fits the data. For example, an $r^2$ value of about 0.9 may fit the data relatively well, while an $r^2$ value of about 0.75 would explain relatively less of the data and, therefore, would not be as relatively good of a fit for the data.

For example, the first pass through step 110 for the table games department may employ regression analysis to convert the aggregated historical variable costs to a first type of mathematical expression (e.g., a linear equation with an $r^2$ value of about 0.9) for this historical variable cost function. Then, the first pass through step 112 would determine that there was no best fit, since only one type of mathematical expression had been considered, and step 110 would be repeated.

Then, the second pass through step 110 for the table games department may employ regression analysis to convert the aggregated historical variable costs to a second type of mathematical expression (e.g., a polynomial equation with an $r^2$ value of about 0.75) for this historical variable cost function. Then, the second pass through step 112 would determine that the linear equation, in this example, was the better fit of those two types of mathematical expressions.

Next, steps 110 and 112 may be repeated, as desired, for other types of mathematical expressions (e.g., logarithmic; exponential; power). Hence, depending on the nature of the variable cost data series, the resultant best-fit (e.g., maximum $r^2$ value) equation may be, for example, linear, polynomial, logarithmic, exponential or power. Then, the final pass through step 112 for the table games department would select the mathematical expression which provides a best fit (e.g., the maximum $r^2$ value) for the historical variable costs.

Then, at 114, it is determined if all of the variable cost functions have been determined for the various gaming departments. In this example, since there is also the EGD department, even steps 110-114 are repeated to determine the mathematical expression that provides the best fit for the historical variable costs for that department. After 114, the next step is 116.

At 116, one or more constraints associated with the different classes of gaming units are determined. Examples of constraints are discussed below in connection with Examples 6 and 11-14. For example, there exists limiting conditions that affect the operation of table games, EGDs, and other gaming units of a casino. For example, there is the finite size of the available space on the casino floor. In addition, management may decide, for marketing or other reasons, that a minimal or maximum number of a specific gaming unit type is needed. Next, at 118, one or more mathematical expressions are developed to represent the relevant constraints on the overall operation of the casino floor.

Next, the optimization method is determined. Based on a review of all of the demand, cost, and constraints functions, at 120, either a linear programming application or a non-linear programming application is employed to solve the objective function and, thus, to determine the optimal values for the counts of gaming units of each class (e.g., decision variable) that would optimize the objective function (i.e., revenue; profit).

Next, at 122, it is determined which optimizing algorithm is appropriate based on the resultant constraints and demand functions for revenue optimization (or constraints, demand and cost functions for profit optimization). If all decision functions and expressions are linear, then linear programming is applied at 124. Otherwise, if any one or more of the decision functions or expressions is non-linear, then non-linear programming is applied at 134.

Linear programs, as applied at 124, are models that seek a solution to an objective function subject to certain limiting conditions or constraints. In linear programs, all equations must be linear in nature (i.e., a power of 1). Linear programming, thus, employs linear functions in which each variable appears in a separate term, there are no powers greater than 1, and there are no logarithmic, exponential, or trigonometric terms. For example, the expression y=mx+b is an example of a linear function.

In contrast, non-linear programs, as applied at 134, are models that seek a solution to an objective function subject to certain limiting conditions or constraints, although all equations are not required to be non-linear in nature. Non-linear programming, thus, employs one or more functions that are not linear. For example, the expression $y=500x^2+35x+6$ is non-linear, since x has a power of 2, which is greater than 1.

Figure 6:
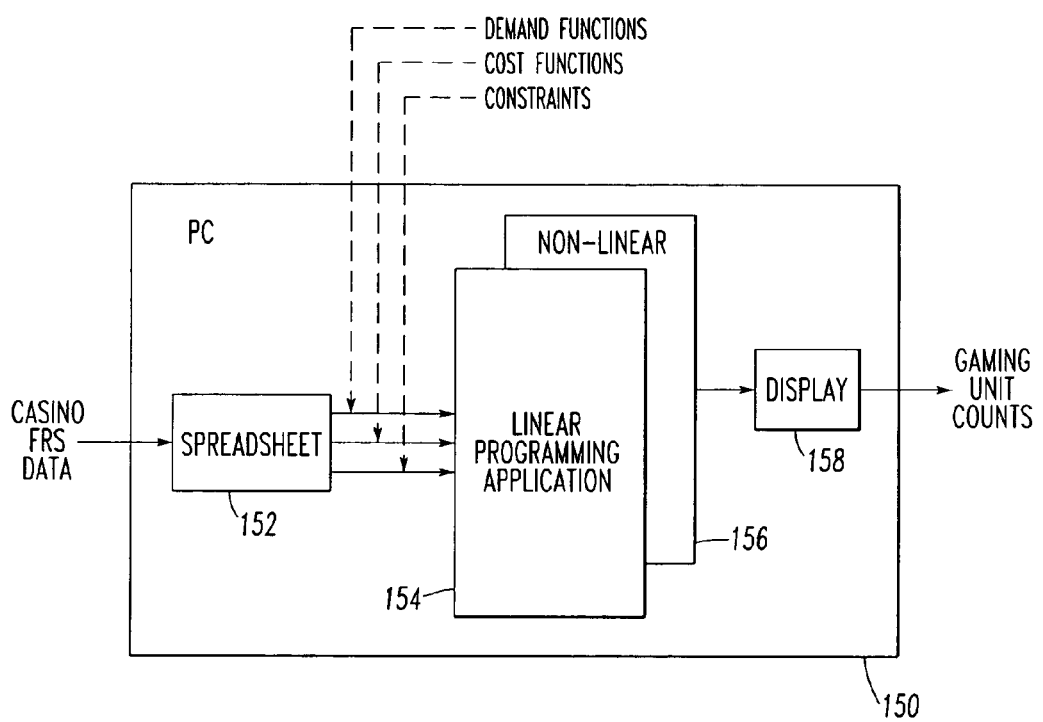
FIG. 6 is a block diagram of a personal computer as employed with the optimization procedure of FIGS. 5A-5B.

In the optimization analysis, at 124 or 134, mathematical expressions that represent all of the constraint and demand (or constraint, demand and cost) functions are input (e.g., into a spreadsheet 152 as shown in FIG. 6). Then, a linear programming application, at 124, or a non-linear programming application at 134 (e.g., applications 154,156 of FIG. 6), is applied to this data to determine the solution to the objective function (i.e., the optimum count of each of the gaming units 8 of FIG. 1 needed to optimize revenue or profit).

These values are reviewed, at 126 and 136, for reasonableness (e.g., as discussed in greater detail, below, in connection with step 126 of Example 6) and, if necessary, the constraints are responsively adjusted (e.g., as discussed in greater detail, below, in connection with step 128 of Example 7), at 128 and 138, respectively, until optimal and reasonable values of decision variables are obtained. Steps 136 and 138 are essentially the same as steps 126 and 128, respectively. After step 128 or 138, step 120 is repeated in order to re-determine the optimal values for the counts (at even steps 120-128 or even steps 120, 122 and 134-138).

FIG. 6 shows a suitable processor, such as a personal computer (PC) 150, employed with the optimization procedure 80 of FIGS. 5A-5B. The various data are imported to the spreadsheet 152 (e.g., Excel marketed by Microsoft Corporation of Redmond, Wash.), the demand functions (even steps 90-96) or demand and cost functions (even steps 100-114) are determined, constraints (steps 116 and 118) presented as mathematical expressions are incorporated, and the linear or non-linear programming applications 154,156 (e.g., Large-Scale LP Solver Engine or Large-Scale GRG Solver Engine marketed by Frontline Systems Inc. Incline Village, Nev.) are employed, although the invention is applicable to a wide range of methods for optimizing profit or revenue of a gambling enterprise, and a wide range of other suitable processors, operating systems, databases, interfaces, programming languages, spreadsheet applications, report applications, and linear and/or non-linear programming applications may be employed. The resultant optimal values of the gaming unit counts are then displayed on display 158. Preferably, these optimal values are employed, as shown with the optimization procedure 24 of FIG. 1, to adjust the counts of the gaming units 8 on the casino floor 6 to correspond to the optimal values.

Linear programming and non-linear programming provide a variety of deterministic approaches used to solve complex computational problems when maximization or minimization of multiple values or decision variables (DVs) contained within a complex problem is desired. These generate results associated with multiple variables in an attempt to optimize a particular value for a specific problem. The various linear and/or non-linear functions, which will reproduce the optimal value, are collectively often referred to as the objective function.

Although linear and non-linear programming are disclosed, other suitable algorithms may be employed to optimize decision variables associated with revenue or profit generated on the casino floor. For example, software algorithms may be employed including mathematical algorithms using, for example, quadratic techniques, matrix algebra and/or simultaneous equation techniques.

EXAMPLE 6

This example is directed to solving a selection problem of gaming units on a casino floor. It will be appreciated that acquiring the best and most productive gaming units for a casino is important to the corresponding casino operator, since any incremental increase in patron volume, generated by providing the most popular mix of gaming units to patrons, can have a significant impact on revenue and, thus, profitability. In addition, since casinos incur significant costs in acquiring table games and EGDs, it is important to spend capital dollars on the highest performing equipment, in order to generate a reasonable return.

This example selection problem is disclosed with respect to FIGS. 5A-5B. First, at 82, the objective function is defined as optimization of profitability generated from gaming units on the casino floor. Although one definition of the objective function is disclosed in this example, this objective function can be defined in other ways, such as, for example, if generating the highest revenue, without regard for the costs involved in operating various gaming departments, is of concern, then the objective function would be defined as the optimization of revenue generated from the gaming units.

Next, at 84, the gaming units are classified in terms of the type of game they represent within the table games department (e.g., blackjack; craps; roulette). For EGDs, the gaming units on the casino floor are identified by their denomination (or the minimum allowable wager). These identifying properties are defined as the decision variables, at 86, and are shown, for this example, in Table 1:

TABLE 1

| Notation | Represents |
| --- | --- |
| Decision Variable: Table Games ($DV_{TG1}$) | Blackjack |
| Decision Variable: Table Games ($DV_{TG2}$) | Craps |
| Decision Variable: Table Games ($DV_{TG3}$) | Roulette |
| Decision Variable: EGDs ($DV_{EGD1}$) | Nickel EGD |
| Decision Variable: EGDs ($DV_{EGD2}$) | Quarter EGD |
| Decision Variable: EGDs ($DV_{EGD3}$) | Dollar EGD |

Based on the availability of data, the analysis period in this example, as selected at 88, is 36 months. Then, time series revenue data including total revenue generated and total units on the floor per period for 36 months is retrieved, at 90, from the FRS 4 of FIG. 1 for $DV_{TG1}$ (i.e., all blackjack tables). Next, at 92, this data is analyzed to determine, using regression analysis techniques for a linear equation, the corresponding mathematical expression that represents the data most accurately. That expression, in this case, is determined to be Equation 1:

$$y=\$12,180*DV_{TG1} \quad \text{(Eq. 1)}$$

wherein:
y is monthly revenue generated from blackjack tables on the casino floor ($DV_{TG1}$).

Next, at 94, as was discussed in greater detail, above, in connection with FIGS. 5A-5B, by reviewing statistical properties (e.g., $r^2$ statistic) associated with this example linear equation and any other equation types (not shown), it is determined that Equation 1 represents a "best fit" equation and, thus, represents the proper demand function for $DV_{TG1}$.

Then, at 96, it is determined if all demand functions have been determined. Since there are six decision variables, in this example, the process is repeated, at 90, 92 and 94, until the demand function for each of the six decision variables is determined. In this example, the six demand functions, as determined, are shown in Table 2:

TABLE 2

| Equation | Decision Variable | Demand Function |
|---|---|---|
| 1 | $DV_{TG1}$ | y = $12,180 * $DV_{TG1}$ |
| 2 | $DV_{TG2}$ | y = $19,980 * $DV_{TG2}$ |
| 3 | $DV_{TG3}$ | y = $14,340 * $DV_{TG3}$ |
| 4 | $DV_{EGD1}$ | y = $2,460 * $DV_{EGD1}$ |
| 5 | $DV_{EGD2}$ | y = $2,490 * $DV_{EGD2}$ |
| 6 | $DV_{EGD3}$ | y = $930 * $DV_{EGD3}$ |

Although six linear equations are shown in Table 2, it will be appreciated that a wide range of counts and of different types of equations may be employed, such as, without limitation, polynomial, logarithmic, exponential, or power. Although monthly revenue is disclosed, smaller or larger time periods may be employed.

Next, at 98, it is determined whether the objective function is to optimize profit. For this example, the answer is yes. Hence, at 100, information is generated on the cost functions that exist within the casino operation that are impacted by the decision variables. Otherwise, if the answer were no, then, the procedure would resume at 116 of FIGS. 5A-5B. This path is discussed below in connection with Example 8.

The relevant gaming departments to be analyzed are determined at 100. For this example, those include the table games department 18 and the EGD department 16 of FIG. 1, although casino management could also choose to incorporate the cost functions associated with other departments (not shown) that are related to other gaming units, such as 14, and other gaming activities (e.g., casino cage; soft count). Then, at 102, time series data including total expenses incurred by the table games department 18 and the EGD department 16 along with corresponding number of total gaming units on the casino floor 6, respectively, for each of the example 36 months is retrieved from the FRS 4. At 104, a distinction is made between fixed and variable costs for the table games department 18 and the EGD department 16, and like data is aggregated, at 106, in order to produce four separate time series that represent fixed table games costs, variable table game costs, fixed EGD costs and variable EGD costs. As fixed costs are, by definition, not a function of total units on the casino floor, the fixed cost functions for the EGD and table games departments 16,18 consist simply of constants, at 108. These constants, for this example, are determined as shown in Equations 7 and 8:

$$FC_{TG} = \$16,280 \quad (Eq. 7)$$

wherein:
$FC_{TG}$ represents the monthly fixed costs in the table games department.

$$FC_{EGD} = \$21,150 \quad (Eq. 8)$$

wherein:
$FC_{EGD}$ represents the monthly fixed costs in the EGD department.

The remaining time series data represents variable costs for the table games department 10 and the EGD department 12. These time series are analyzed, at 110, to determine the mathematical expression that represents the data most accurately. The expression for variable cost table games data, in this example, is determined to be Equation 9:

$$VC_{TG} = \$9,459 * DV_{TG} \quad (Eq. 9)$$

wherein:
$VC_{TG}$ represents the monthly variable costs generated from the table games department as a function of the total number of table game units on the casino floor ($\Sigma DV_{TG}$).

As was discussed in greater detail, above, in connection with FIGS. 5A-5B, by reviewing statistical properties (e.g., $r^2$ statistic) associated with the example linear Equation 9, it is determined, at 112, that Equation 9 represents a "best fit" equation and thus represents the proper variable cost function for the table games department ($VC_{TG}$).

Next, at 114, it is determined if all variable cost functions have been determined and the process is repeated, at 110 and 112, in order that the variable cost function for the EGD department is determined. In this example, the fixed cost constants and variable cost functions are summarized by Table 3:

TABLE 3

| Equation | Cost | Function |
|---|---|---|
| 7 | $FC_{TG}$ | $FC_{TG}$ = $16,280 |
| 8 | $FC_{EGD}$ | $FC_{EGD}$ = $21,150 |
| 9 | $VC_{TG}$ | $VC_{TG}$ = $9,459 * $\Sigma DV_{TG}$ |
| 10 | $VC_{EGD}$ | $VC_{EGD}$ = $420 * $\Sigma DV_{EGD}$ |

Although four linear equations are shown in Table 3, it will be appreciated that a wide range of counts and of different types of equations may be employed, such as, without limitation, polynomial, logarithmic, exponential, or power. Although monthly revenue is disclosed, smaller or larger time periods may be employed.

Next, at 116, constraints are determined that realistically represent the state of the casino operation. In this example, the constraints are determined and translated into mathematical expressions, at 118. For example, the casino floor may be limited to 24,000 square feet. Subsequently, all decision variables are assigned a square footage amount (i.e., the area that they require to be operational). For example, these assignments may be: $DV_{TG1}$: 40 sq. ft.; $DV_{TG2}$: 100 sq. ft.; $DV_{TG3}$: 80 sq. ft.; $DV_{EGD1}$: 20 sq. ft.; $DV_{EGD2}$: 20 sq. ft.; and $DV_{EGD3}$: 20 sq. ft.

In this example, the decision variable values are represented by integers (e.g., there cannot be half of a table game; there cannot be a third of an EGD) and are non-negative.

Finally, given casino management's understanding of their target gaming patrons, minimums and maximums may be imposed on the selection problem in order to assure that the solution is reasonable and, thus, serves the needs of the casino patrons. These minimum and maximum counts are defined for this example as shown in Table 4:

TABLE 4

| Minimum | Decision Variable | Maximum |
|---|---|---|
| 10 | $DV_{TG1}$ | 20 |
| 1 | $DV_{TG2}$ | 10 |

TABLE 4-continued

| Minimum | Decision Variable | Maximum |
|---|---|---|
| 1 | $DV_{TG3}$ | 5 |
| 25 | $DV_{EGD1}$ | 100 |
| 25 | $DV_{EGD2}$ | 1000 |
| 25 | $DV_{EGD3}$ | 500 |

All demand, cost and constraint expressions for this selection problem are reviewed, at 120, to determine if all expressions are linear. This is to determine which optimization process is employed—linear programming or non-linear programming. In this example, all expressions are linear, at 122, and, thus, the procedure resumes at 124. At 124, suitable linear programming techniques are applied to solve for the values of the decision variables that will maximize the objective function and optimize profitability given the set constraints. This provides the solution shown in Table 5:

TABLE 5

| Decision Variable | Value |
|---|---|
| $DV_{TG1}$ | 20 |
| $DV_{TG2}$ | 10 |
| $DV_{TG3}$ | 5 |
| $DV_{EGD1}$ | 100 |
| $DV_{EGD2}$ | 500 |
| $DV_{EGD3}$ | 490 |

Then, at 126, this solution is reviewed for reasonableness. Since this is a workable mix of blackjack, craps, and roulette tables, and nickel, quarter and dollar slot machines that will fit within the 24,000 square foot casino, it is accepted and the example is done at 140.

EXAMPLE 7

This example shows an unreasonable solution and the constraints being adjusted or added at 128 of FIG. 5B. This example is similar to Example 6 except that Table 6 replaces Table 4 and Table 7 replaces Table 5.

As shown in Table 6, given the initial constraints provided in Table 7, the solution at 124 of FIG. 5B suggests that the casino should employ 594 blackjack tables and only one of each of the values of the other decision variables (e.g., craps, roulette, Nickel EGD, Quarter EGD, Dollar EGD). This solution is considered unreasonable at 126, and the constraints are adjusted at 128 to be those shown in Table 4 of Example 6, which would produce a reasonable solution at 124 and 126.

TABLE 6

| Minimum | Decision Variable | Maximum |
|---|---|---|
| 1 | $DV_{TG1}$ | 2000 |
| 1 | $DV_{TG2}$ | 2000 |
| 1 | $DV_{TG3}$ | 2000 |
| 1 | $DV_{EGD1}$ | 2000 |
| 1 | $DV_{EGD2}$ | 2000 |
| 1 | $DV_{EGD3}$ | 2000 |

TABLE 7

| Decision Variable | Value |
|---|---|
| $DV_{TG1}$ | 594 |
| $DV_{TG2}$ | 1 |

TABLE 7-continued

| Decision Variable | Value |
|---|---|
| $DV_{TG3}$ | 1 |
| $DV_{EGD1}$ | 1 |
| $DV_{EGD2}$ | 1 |
| $DV_{EGD3}$ | 1 |

EXAMPLE 8

This example is similar to Example 6, except that revenue is optimized rather than profit, Table 2 is replaced by Table 8, Table 3 is not employed, Table 4 is replaced by Table 9, and Table 5 is replaced by Table 10:

TABLE 8

| Equation | Decision Variable | Demand Function |
|---|---|---|
| 1' | $DV_{TG1}$ | $y = \$24{,}000 * DV_{TG1}$ |
| 2' | $DV_{TG2}$ | $y = \$19{,}980 * DV_{TG2}$ |
| 3' | $DV_{TG3}$ | $y = \$14{,}340 * DV_{TG3}$ |
| 4' | $DV_{EGD1}$ | $y = \$2{,}460 * DV_{EGD1}$ |
| 5' | $DV_{EGD2}$ | $y = \$2{,}490 * DV_{EGD2}$ |
| 6' | $DV_{EGD3}$ | $y = \$930 * DV_{EGD3}$ |

TABLE 9

| Minimum | Decision Variable | Maximum |
|---|---|---|
| 10 | $DV_{TG1}$ | 100 |
| 2 | $DV_{TG2}$ | 100 |
| 2 | $DV_{TG3}$ | 100 |
| 25 | $DV_{EGD1}$ | 100 |
| 25 | $DV_{EGD2}$ | 500 |
| 25 | $DV_{EGD3}$ | 500 |

TABLE 10

| Decision Variable | Value |
|---|---|
| $DV_{TG1}$ | 100 |
| $DV_{TG2}$ | 100 |
| $DV_{TG3}$ | 100 |
| $DV_{EGD1}$ | 25 |
| $DV_{EGD2}$ | 50 |
| $DV_{EGD3}$ | 25 |

EXAMPLE 9

This example is similar to Example 6, except that revenue is optimized rather than profit, Table 2 is replaced by Table 11, Table 3 is not employed, Table 4 is replaced by Table 12, and Table 5 is replaced by Table 13:

TABLE 11

| Equation | Decision Variable | Demand Function |
|---|---|---|
| 1" | $DV_{TG1}$ | $y = \$24{,}000 * DV_{TG1}$ |
| 2" | $DV_{TG2}$ | $y = \$19{,}980 * DV_{TG2}$ |
| 3" | $DV_{TG3}$ | $y = \$14{,}340 * DV_{TG3}$ |
| 4" | $DV_{EGD1}$ | $y = \$2{,}460 * DV_{EGD1}$ |
| 5" | $DV_{EGD2}$ | $y = \$DV_{EGD2}^2 + \$400 * DV_{EGD2} + \$50$ |
| 6" | $DV_{EGD3}$ | $y = \$930 * DV_{EGD3}$ |

TABLE 12

| Minimum | Decision Variable | Maximum |
|---|---|---|
| 10 | $DV_{TG1}$ | 100 |
| 2 | $DV_{TG2}$ | 100 |
| 2 | $DV_{TG3}$ | 100 |
| 25 | $DV_{EGD1}$ | 100 |
| 25 | $DV_{EGD2}$ | 500 |
| 25 | $DV_{EGD3}$ | 500 |

TABLE 13

| Decision Variable | Value |
|---|---|
| $DV_{TG1}$ | 100 |
| $DV_{TG2}$ | 88 |
| $DV_{TG3}$ | 2 |
| $DV_{EGD1}$ | 27 |
| $DV_{EGD2}$ | 500 |
| $DV_{EGD3}$ | 25 |

In this example, the demand function (Equation 5") for $EGD_2$ is clearly non-linear (i.e., contains a term with a power greater than 1). Therefore, suitable non-linear programming techniques are employed, at 134, to solve for the values of the decision variables that will maximize the objective function (optimize revenue) given the set constraints. In this example, the values are accepted and the example is done at 142.

EXAMPLE 10

This example shows detailed single decision variable variations in historical and current demand. Demand functions are generated from data readily available from the CMS 2 and FRS 4 of FIG. 1. Generally, such data is available on a daily basis and can often be obtained on an hourly or by-shift basis. Table 14 shows a typical partial (for economy of disclosure, only some of the data at some of the dates are shown) data series used to determine the demand function for Blackjack tables:

TABLE 14

| Date | No. Units (Var. X) | Blackjack Revenue (Var. Y) |
|---|---|---|
| Jan. 5, 2004 | 20 | $9,320 |
| Jan. 4, 2004 | 20 | $9,010 |
| Jan. 3, 2004 | 20 | $8,885 |
| Jan. 2, 2004 | 20 | $8,600 |
| Jan. 1, 2004 | 20 | $9,576 |
| Dec. 31, 2003 | 20 | $8,045 |
| Dec. 30, 2003 | 22 | $11,000 |
| ... | ... | ... |
| Mar. 16, 2000 | 28 | $12,010 |
| Mar. 15, 2000 | 28 | $11,980 |

Running a regression analysis on the data from Table 14 will reveal the demand function. As this data series includes both generally current revenue data (e.g., yesterday; one week ago; last month) as well as historical data (e.g., last year; two years ago), the resultant curve will show the effects of changes in revenue (variable Y) on changes in number of units (variable X) over both the short and long term. In this way, the demand function incorporates both short-term demand information as well as historical demand information.

Examples 11-14 consider other alternative example constraints that can be imposed in the disclosed method, at 116.

EXAMPLE 11

If the decision variables are units defined by their manufacturer (e.g., Bally Gaming System EGDs; International Gaming Technology EGDs), then constraints may be developed to, for example, force a solution requiring at least a certain minimum number of units for one or more manufacturers in order to take advantage of quantity purchasing discounts. Hence, there may be a plurality of different electronic gaming devices, with one of the decision functions being a minimum count of the different electronic gaming devices from a particular manufacturer. The constraint, thus, associates a discount from the particular manufacturer with the minimum count, and ensures that the discount is received by providing the minimum count with the optimal values, as determined.

EXAMPLE 12

If the decision variables are units defined by their personality or "theme" (e.g., Double Diamond; Wheel of Fortune), then constraints may be developed to, for example, force a solution requiring a certain maximum number of units for each theme to ensure that there are not too many of one type and thus provide a variety of choices available to the gaming patron. Hence, for example, by employing as one of the decision functions a maximum count of the different EGDs of a particular one of the personalities or themes (e.g., Double Diamond), then the constraint is employed to require that maximum count when the optimal values are determined.

EXAMPLE 13

Constraints may be developed to force the solution set to adhere to a certain market positioning (e.g., relatively more table games and relatively less EGDs; relatively more EGDs and relatively less table games). Hence, the constraint may require, for example, a greater count of the EGDs with respect to the table games, when the optimal values are determined.

EXAMPLE 14

Constraints may be developed to consider the physical space available for unit placement. Here, for example, the casino floor may have a physical area, and there may be a physical area associated with each of the different gaming units. The constraint may require that the total combined physical area of the different EGDs and the total combined physical area of the different table games is less than or equal to the total physical area of the casino floor when the optimal values are determined.

EXAMPLE 15

Although Equations 7-10 of Table 3 show total fixed costs and total variable costs for each of the EGD and table games departments, it is possible to determine an historical fixed cost function and an historical variable cost function for each of the different classes of gaming units. For example, the FRS 4 of FIG. 1 may provide, directly or indirectly, fixed and variable cost functions for each one of the gaming units 8, or for each of the classes of the gaining units.

EXAMPLE 16

Although the CMS 2 and FRS 4 of FIG. 1 are shown, data collection with respect to relevant data associated with the gaming units or unit characteristics or classifications may originate from a wide range of sources (e.g., manufacturers; suppliers; taxing authorities; regulatory authorities; industry organizations).

EXAMPLE 17

Step 90 of FIG. 5A may obtain the current and historical times series data for the decision variables from a user interface of a financial reporting system, such as, for example, a graphical user interface, a text user interface, a DOS user interface, or any other electronic or automated user interface (e.g., of the CMS 2 or FMS 4 of FIG. 1), wherein a user retrieves revenue ("win") and total unit count time series data by classes (e.g., decision variables).

EXAMPLE 18

Similar to Example 17, step 102 of FIG. 5A may determine the time series data on fixed and variable costs for relevant gaming departments (e.g., table games department; EGD department) from a user interface of a financial reporting system.

EXAMPLE 19

As an alternative to or in addition to even steps 90-96 of FIG. 5A, if participation gaming units are/were on the casino floor at any time during the selected analysis period of step 88, then a separate time series is retrieved that shows total revenue from participation games, along with the number of games on the casino floor for the same time period.

EXAMPLE 20

As an alternative to or in addition to even steps 100-114 of FIG. 5A, if participation gaming units are/were on the casino floor at any time during the selected analysis period of step 88, then a separate time series is retrieved that shows total participation royalties (i.e., costs to the casino) and other costs, along with the number of games on the casino floor for the same points in time. These royalties and other costs are segregated between fixed and variable costs at 104. A fixed cost function for participation games is determined at 108. A variable cost function for participation games is defined using the regression analysis techniques at step 110. Depending on the nature of the variable cost data series, the resultant best-fit equation (e.g., least squares) from step 112 may be, for example, linear, polynomial, logarithmic, exponential or power.

The disclosed linear and non-linear programming techniques for a gambling enterprise as applied to particular gaming unit types and classes is extremely advantageous to gambling operators. These techniques, more specifically, permit the gambling industry to predict and optimize revenue or profit for a particular gaming unit type or class and to determine exactly what combination of gaming unit types or classes should be deployed on the casino floor for maximum revenue or profit.

While for clarity of disclosure reference has been made herein to the exemplary user interface display 158 for displaying optimal counts, it will be appreciated that such counts may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for optimizing profit for a gambling enterprise, said method comprising:
employing a plurality of different gaming units in said gambling enterprise;
employing a plurality of counts, one of said counts for each of said different gaming units;
employing a plurality of decision functions, at least one of said decision functions for each of said different gaming units;
employing profit optimization as an objective function;
determining with a processor optimal values for said counts for each of said different gaming units from said decision functions in order to optimize said objective function;
adjusting said counts for each of said different gaming units to be said optimal values for said counts in said gambling enterprise;
employing at least one constraint for at least some of said different gaming units as one of said decision functions;
determining time series revenue data for said different gaming units and determining a demand function for each of said different gaming units;
determining time series cost data for said different gaming units and determining a cost function for said different gaming units;
employing said demand function for each of said different gaming units and said cost function for said different gaming units as some of said decision functions; and
determining said optimal values from said at least one constraint, said demand function for each of said different gaming units and said cost function for said different gaming units.

2. The method of claim 1 further comprising:
employing as said gaming units a plurality of table games and a plurality of electronic gaming devices.

3. The method of claim 1 further comprising:
employing a plurality of different electronic gaming devices as some of said different gaming units;
employing as one of said decision functions a minimum count of said different electronic gaming devices from a particular manufacturer;
associating a discount from said particular manufacturer with said minimum count; and
receiving said discount from said minimum count with some of said optimal values for said counts.

4. The method of claim 1 further comprising:
employing a plurality of different electronic gaming devices as some of said different gaming units;
employing a plurality of different personalities or themes with said different electronic gaming devices;
employing as one of said decision functions a maximum count of said different electronic gaming devices of a particular one of said personalities or themes; and
employing a constraint to require said maximum count when said optimal values are determined for said counts for each of said different gaming units.

5. The method of claim 1 further comprising:
employing a plurality of different electronic gaming devices and a plurality of different table games as some of said different gaming units; and
employing a constraint to require a greater count of one of said different electronic gaming devices and said different table games with respect to said different table games and said different electronic gaming devices, respectively, when said optimal values are determined for said counts for each of said different gaming units.

6. The method of claim 1 further comprising:
employing a casino floor having a physical area as said gambling enterprise;
employing a physical area associated with each of said different gaming units;
employing a plurality of different electronic gaming devices and a plurality of different table games as some of said different gaming units; and
employing a constraint to require the physical area of said different electronic gaming devices and the physical area of said different table games to be less than or equal to the physical area of said casino floor when said optimal values are determined for said counts for each of said different gaming units.

7. The method of claim 1 further comprising:
employing a predetermined time period of greater than one year for at least some of said decision functions.

8. The method of claim 1 further comprising:
employing a predetermined time period for at least some of said decision functions; and
including current and historical time series revenue data and current and historical time series cost data in the predetermined time period for said at least some of said decision functions.

9. The method of claim 1 further comprising:
displaying said optimal values.

10. A method for optimizing profit for a gambling enterprise, said method comprising:
identifying a plurality of different classes of gaming units in said gambling enterprise;
employing a count for each of said different classes;
employing at least one decision function for said different classes;
employing profit optimization as an objective function;
determining time series revenue data for said different classes and determining a demand function for each of said different classes;
determining time series cost data for said different classes and determining a cost function for said different classes;
determining with a processor optimal values for said counts for each of said different classes from said at least one decision function, said demand function for each of said different classes and said cost function for said different classes, in order to optimize said objective function; and
adjusting said counts for each of said different classes to be said optimal values for said counts in said gambling enterprise.

11. The method of claim 10 further comprising:
employing a predetermined time period of greater than one year for said time series revenue data, said demand functions, said time series cost data, and said cost functions.

12. The method of claim 10 further comprising:
employing a plurality of constraints associated with said different classes of gaming units;
translating said constraints to mathematical expressions;
employing said mathematical expressions as said at least one decision function; and
employing said demand functions, said cost functions and said mathematical expressions to determine said optimal values for said counts.

13. The method of claim 12 further comprising:
employing one of linear programming and non-linear programming to determine said optimal values for said counts.

14. The method of claim 12 further comprising:
determining whether said optimal values for said counts are reasonable values based upon said optimal values for said counts for each of said different classes resulting in a floor space of the different classes of the gaming units in said gambling enterprise being less than a predetermined value;
responsively adjusting said constraints;
translating said adjusted constraints to a plurality of corresponding mathematical expressions; and
re-determining optimal values for said counts for each of said different classes from said demand function for each of said different classes, said cost function for said different classes and said corresponding mathematical expressions, in order to optimize said objective function and optimize profit from said different classes of gaming units.

15. The method of claim 12 further comprising:
determining said time series revenue data and said time series cost data from a user interface of a financial reporting system.

16. The method of claim 12 further comprising:
identifying a plurality of gaming departments associated with said plurality of different classes of gaming units;
determining historical fixed costs and historical variable costs for each of said gaming departments; and
determining an historical fixed cost function and an historical variable cost function for each of said gaming departments from said historical fixed costs and said historical variable costs, respectively.

17. The method of claim 16 further comprising:
employing as said different classes of gaming units a first count of table games and a second count of electronic gaming devices;
employing as said gaming departments a table games department for said table games and an electronic gaming devices department for said electronic gaming devices;
employing a predetermined time period for each of said historical fixed cost functions and said historical variable cost functions;
providing a variable cost function for the table games department as a function of the first count of table game units;
providing a variable cost function for the electronic gaming devices department as a function of the second count of electronic gaming devices;
providing a fixed cost for the table games department; and
providing a fixed cost for the electronic gaming devices department.

18. The method of claim 16 further comprising:
employing a constant value for each of said historical fixed cost functions; and
employing regression analysis to convert each of said historical variable costs to a mathematical expression for a corresponding one of said historical variable cost functions.

19. The method of claim 18 further comprising:
for one of said historical variable costs for a corresponding one of said historical variable cost functions, employing as said mathematical expression for a corresponding one of said historical variable cost functions a first type of mathematical expression;

selecting a different second type of mathematical expression;

employing regression analysis to convert said one of said historical variable costs for the corresponding one of said historical variable cost functions to said different second type of mathematical expression for the corresponding one of said historical variable cost functions; and employing one of said first type of mathematical expression and said second type of mathematical expression which provides a better fit of said historical variable costs.

20. The method of claim 10 further comprising:

determining an historical fixed cost function and an historical variable cost function for each of said different classes of gaming units.

21. The method of claim 10 further comprising:

translating said demand function and said cost function to a plurality of polynomial equations; and determining said optimal values from said at least one decision function and said polynomial equations, in order to optimize said objective function.

22. The method of claim 10 further comprising:

displaying said optimal values.

\* \* \* \* \*